(12) United States Patent
Werner et al.

(10) Patent No.: US 9,486,900 B2
(45) Date of Patent: *Nov. 8, 2016

(54) SCREW DRIVE DESIGN

(71) Applicant: Arnold Umformtechnik GmbH & Co. KG, Forchtenberg-Ernsbach (DE)

(72) Inventors: Patrick Werner, Bermatingen (DE); Gerhard Moeller, Forchtenberg (DE); Dirk Doellner, Heilbronn (DE)

(73) Assignee: Arnold Umformtechnik GmbH & Co. KG, Forchtenberg-Ernsbach (DE)

( * ) Notice: Subject to any disclaimer, the term of this patent is extended or adjusted under 35 U.S.C. 154(b) by 197 days.

This patent is subject to a terminal disclaimer.

(21) Appl. No.: 14/046,544

(22) Filed: Oct. 4, 2013

(65) Prior Publication Data

US 2014/0102264 A1 Apr. 17, 2014

Related U.S. Application Data

(62) Division of application No. 13/056,364, filed on Apr. 20, 2011, now Pat. No. 8,549,962.

(30) Foreign Application Priority Data

Jul. 31, 2008 (DE) .................. 10 2008 036 577

(51) Int. Cl.
*B25B 15/00* (2006.01)
*F16B 41/00* (2006.01)
*F16B 23/00* (2006.01)

(52) U.S. Cl.
CPC ......... *B25B 15/005* (2013.01); *F16B 23/0007* (2013.01); *F16B 23/0061* (2013.01); *F16B 23/0076* (2013.01); *F16B 41/005* (2013.01)

(58) Field of Classification Search
CPC ............ B25B 15/005; F16B 23/0007; F16B 23/0061; F16B 23/0076; F16B 41/005
USPC .................... 81/436, 460; 411/403, 911, 919
See application file for complete search history.

(56) References Cited

U.S. PATENT DOCUMENTS

| | | | | |
|---|---|---|---|---|
| 131,843 | A | * | 10/1872 | Brooks ........................ 411/402 |
| 1,249,592 | A | * | 12/1917 | Bruhn .......................... 411/394 |
| 1,956,963 | A | * | 5/1934 | Salmen, Jr. ................... 411/405 |

(Continued)

FOREIGN PATENT DOCUMENTS

| | | |
|---|---|---|
| CH | 201 705 A | 12/1938 |
| DE | 1 911 801 U | 3/1965 |

(Continued)

*Primary Examiner* — David B Thomas
(74) *Attorney, Agent, or Firm* — Boyle Fredrickson, S.C.

(57) ABSTRACT

A screwdriver drive design for a screwdriver features an engagement end that is complementary to a fastening element drive design for a fastening element to be screwed. The fastening element drive design includes at least two drive surfaces formed on the fastening element for transmission of a torque suitable for rotation with a tool in a first rotation direction and transition surfaces disposed between these drive surfaces. The transition surfaces form a guide surface for the tool when rotating the tool in the first rotation direction and upon engagement of the tool in the other rotation direction causes an axial outward displacement of the tool, wherein the transition surfaces are formed as outside surfaces, and wherein the outside of the fastening element, outside the transition surfaces and the drive surfaces, lies in a cylindrical jacket forming a recess.

14 Claims, 4 Drawing Sheets

(56) References Cited

U.S. PATENT DOCUMENTS

| | | | | |
|---|---|---|---|---|
| 2,538,350 | A | * | 1/1951 | Baule .......................... 411/403 |
| 3,134,292 | A | * | 5/1964 | Walton ......................... 411/403 |
| 3,253,625 | A | | 5/1966 | Oestereicher |
| 3,302,672 | A | * | 2/1967 | Walton ........................... 81/461 |
| 3,313,198 | A | * | 4/1967 | Walton ......................... 411/402 |
| 3,331,274 | A | * | 7/1967 | Walton ......................... 411/403 |
| 4,125,051 | A | * | 11/1978 | Herkes et al. ............... 411/402 |
| 4,311,071 | A | * | 1/1982 | Bassell ........................... 81/436 |
| 4,429,599 | A | * | 2/1984 | La Sante, Sr. ................ 81/436 |
| 5,340,256 | A | * | 8/1994 | Morgan ........................ 411/405 |
| 5,598,753 | A | * | 2/1997 | Lee ................................ 81/460 |
| 5,647,712 | A | * | 7/1997 | Demirdogen et al. ........ 411/404 |
| 5,765,980 | A | | 6/1998 | Sudo et al. |
| 6,196,091 | B1 | * | 3/2001 | Khokhar et al. ............... 81/460 |
| 2004/0228703 | A1 | * | 11/2004 | Such ............................ 411/403 |
| 2008/0145171 | A1 | | 6/2008 | Smetz |
| 2008/0145181 | A1 | | 6/2008 | Lynes et al. |

FOREIGN PATENT DOCUMENTS

| | | |
|---|---|---|
| DE | 7 901 702 U1 | 11/1979 |
| DE | 34 03 063 A1 | 8/1985 |
| GB | 2 149 872 A | 6/1985 |
| GB | 2 316 989 A | 3/1998 |

\* cited by examiner

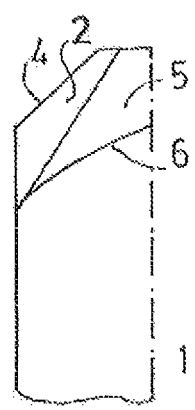 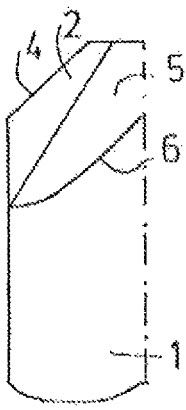
FIG. 3  FIG. 4
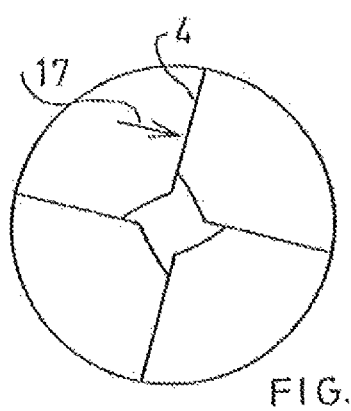 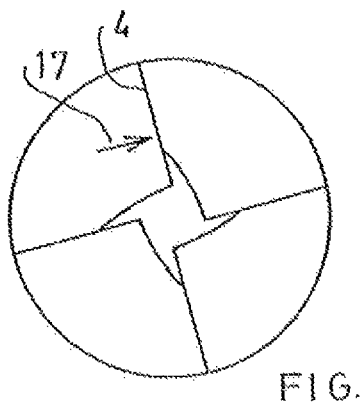
FIG. 5  FIG. 6
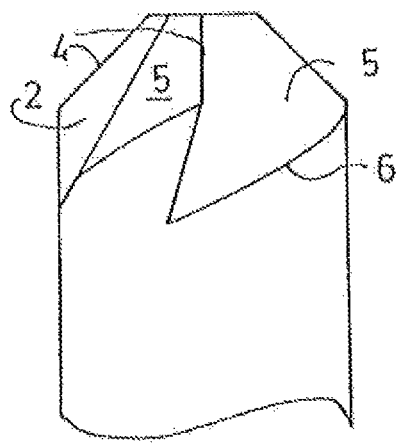 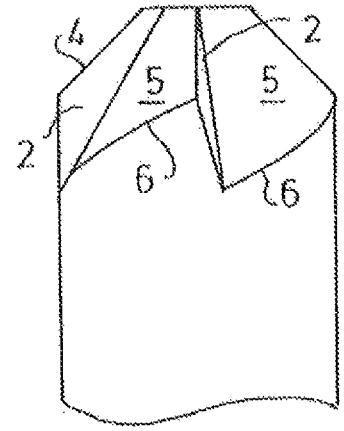
FIG. 7  FIG. 8

SCREW DRIVE DESIGN

CROSS-REFERENCE TO RELATED APPLICATION

This application is a divisional of U.S. patent application Ser. No. 13/056,364, entitled "Screw Drive Design," filed Apr. 20, 2011, the disclosure of which is hereby expressly incorporated by reference.

FIELD OF THE INVENTION

The present invention relates to a drive design for screws, nuts or the like.

BACKGROUND OF THE INVENTION

There are cases in which, for safety reasons, screws or nuts must be secured in a manner that rules out the loosening of said screw or nut. So far, it is standard in such cases to incapacitate the screw drive that serves for the application of a tool after the screw has been fastened. This can happen, for example, through boring or smashing the plug that then prevents the application of a tool into the drive design. There are also tear-off screws on which a predetermined breaking point is provided, which gives way upon attaining the required torque. All these systems have the disadvantage that they require additional measures and, in part, they must be handled pedantically. Moreover, tear-off screws pose the problem of corrosion.

A screw is already known, in which the rotation drive is provided with three triangle-shaped contact surfaces in a recess of the screw head, respectively located in a radial plane. A special screwdriver can be used to drive in these screws, whereas, in the reversed direction of rotation, the tool does not drive the screw (DE 3403063 A1).

The objective of the invention is to create a possibility of designing connections to be established by means of screws, so that they can only be loosened with difficulty or if destroyed.

To meet this objective, the invention proposes a drive design with the features of claim 1. The invention also proposes a drive design for an accompanying tool. Further embodiments of the invention are the object of dependent claims.

This means that one can rotate the fastening element in one direction, naturally the drive-in direction; however, torque transmission is not possible in the reversed direction of rotation. This can be achieved, for example, in that the transition surfaces extend so obliquely that the force applied in the direction of rotation produces a force component that presses the tool out of the recess.

In a further embodiment of the invention, the transition surfaces that serve for guiding the tool in the rotation drive can be formed as inwardly aligned inside surfaces. The tool therefore engages with them with a radial outside part.

It is, however, also possible and within the scope of the invention that the transition surfaces are formed as radial outside surfaces. In this case, the tool grips on the outside surfaces.

Particularly, it can be made possible that the drive surfaces and the transition surfaces are formed in a recess originating from the end face of the fastening element. In this case, it relates to a screw, for example, with which the end face of the screw head facilitates the access to the recess. In this case, the screw head of such a screw therefore contains a recess in which at least two drive surfaces suitable for the transmission of torque are arranged for rotating with a tool in a direction of rotation, between which transition surfaces are disposed, which, upon engagement of the tool in the other direction, cause an axial displacement of the tool out of the recess.

In order to cause a particularly effective force transmission when driving in the screw, in accordance with the invention it can be provided that the drive surfaces are disposed in radial planes. A certain deviation from the radial plane is also possible, so that, in a further embodiment through the drive design, the invention proposes that in a cross-section extending transversely to the axis of the screw the drive surfaces lie respectively on a radius or extend parallel to one another.

With an even number of drive surfaces, it can be provided therefore in accordance with the invention that the drive surfaces in a cross-section extending transversely to the axis of the screw through the drive design lie on a diameter or extend parallel to one another and on a diameter.

In a longitudinal section through the fastening element, the drive surfaces extend preferably parallel to the axis or in the axis.

In a further embodiment of the invention, it can be made possible that the drive surfaces form a drive edge that extends obliquely to the axis, whereby the drive edges of all drive surfaces diverge in the direction of the end face of the screw head.

For example, the drive edges can extend between the wall of the recess and the bottom of the recess.

In accordance with the invention, it can be made possible that the transition surfaces are formed as wedged surfaces, whereby the wedge is oriented such that, by introducing torque in the reverse screwing direction, a force component is produced out of the recess.

Particularly, it can be made possible that the transition surfaces extend between the drive edge of a drive surface of the drive surface connection with the bottom of the recess and the wall of the recess.

It has turned out to be particularly practical if the drive design comprises an odd number of drive surfaces and transition surfaces.

In a further embodiment of the invention, it can be made possible that the recess at least partially features a decreasing cross-section in the direction from the end face away from the screw head. This is reasonable particularly in the case of countersunk screws.

In yet a further embodiment of the invention, it can be made possible that the recess is formed at least partially cylindrical. Such a cylindrical recess can also serve to improve the guidance of a tool better than it would in a recess that decreases in cross-section right from the beginning.

In accordance with the invention, it can be made possible that the recess runs in a pointed tip.

However, it is also possible and proposed by the invention that the recess features a bottom that is formed preferably plane.

In accordance with the invention, it can be made possible that the wall of the recess at least in an axial section lies on a cylindrical jacket surface, particularly in a section originating from the end face of the screw head.

The screwdriver also proposed by the invention features a free end the drive design of which is formed complementarily to the drive design of the screw head.

Further features, details and advantages of the invention are derivable from the claims and abstract, whereby the wording in both is based on reference to the contents of the description, following description of preferred embodiments of the invention as well as of the drawing. Shown hereby:

BRIEF DESCRIPTION OF THE DRAWINGS

FIG. 3 shows a schematic side view of the front end of a screwdriver;

FIG. 4 a representation corresponding to FIG. 3;

FIG. 5 a schematic representation of the recess in a screw head;

FIG. 6 a representation corresponding to FIG. 5 of a modified embodiment;

FIG. 7 the side view of the front end of a screwdriver;

FIG. 8 a representation corresponding to FIG. 7 of a modified embodiment;

DETAILED DESCRIPTION OF THE PREFERRED EMBODIMENT

Figure 1:
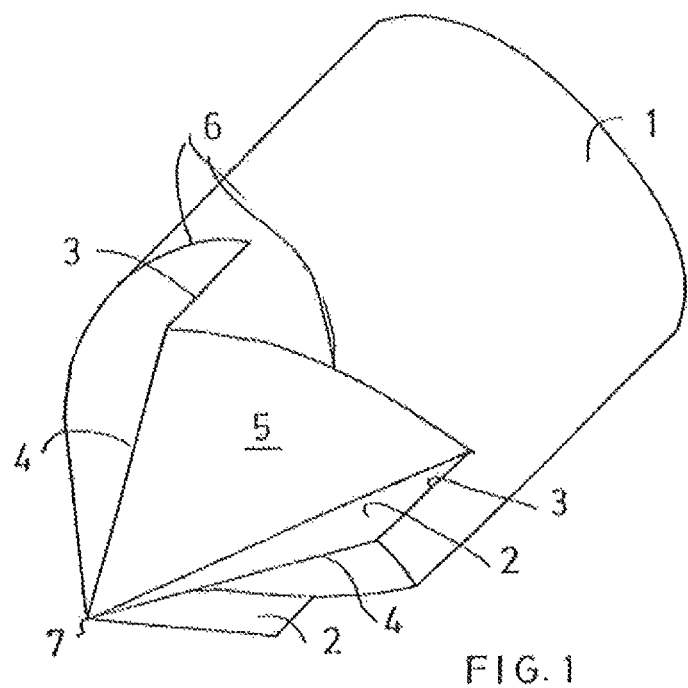
FIG. 1 the perspective schematic view of the free end of a screwdriver.

FIG. 1 shows a perspective view of the front end of a screwdriver that features a circular cylindrical shaft 1. Because the drive design of the screw and screwdriver are formed complementarily to each other, however, the drive design of different surfaces can be represented better on a surface disposed outwardly such as on a screwdriver than in a recess, the following two types of representation are used. On the shaft 1 of the screwdriver, the drive surfaces 2 are formed, which lie in a radial plane. The drive surfaces 2 are limited, on the one hand, through the cylindrical outside of the shaft 1 and form an edge 3 at that point. The conical tip of the screwdriver shaft 1 then forms a second edge 4 with the drive surface 2 that is designated as a drive edge in the following passage. The drive surfaces 2 extend therefore from the outside of the shaft on the edge 3 into the material of the screwdriver shaft 1.

From the drive edges 4, transition surfaces 5 then extend, which form a boundary line 6 with the outside of the shaft 1. They extend therefore from the drive edge 4 aligned forward respectively on a drive surface to the opposite end of the drive surface 2. Viewed from the side, the transition surfaces 5 thus form wedged surfaces, while the drive surfaces 2 lie in radial planes.

If one rotates the screwdriver around its longitudinal axis, the drive surfaces 2 produce torque in rotation direction for a clockwise rotation, while for counterclockwise rotation the transition surfaces 5 produce a force component also in axial direction. Based on the embodiment of the transition surfaces 5, this force component in axial direction is greater than the force component in circumferential direction. Because the part of the drive surfaces 2 directly in the tip 7 section can contribute only slightly to the transmission of torque, this tip can be flattened out in accordance with the invention, for example in the form of a plane end face.

Figure 2:
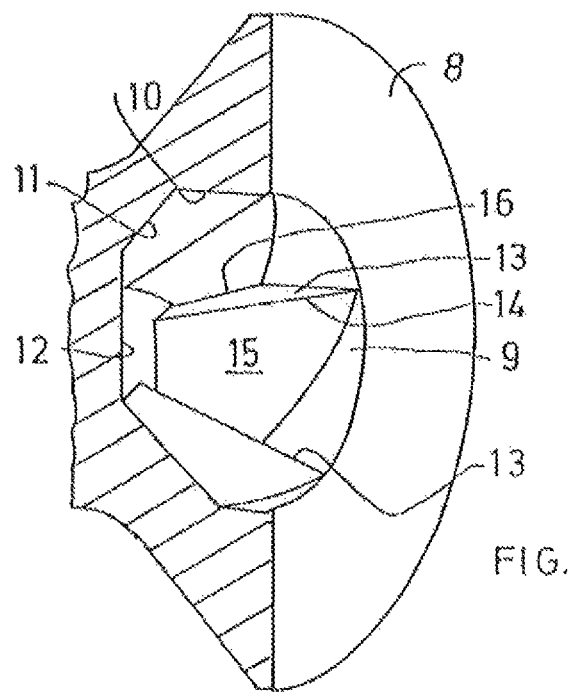
FIG. 2 a partial section through a screw head.

FIG. 2 shows a section through a screw head. It relates to a countersunk head. Starting from a plane end face 8, a recess 9 is accommodated in the screw head. The recess 9, in its section adjoining the end face 8 directly, has a cylindrical cross-section or a cylindrical wall 10 that is visible in the section. On this section, a section then adjoins in that the wall 11 of the recess 9 lies on a conical surface, thus it continuously decreases inwards of the recess. The recess is closed by a bottom 12.

In the recess, inward protrusions are formed, which are complementary to the arrangement of the surfaces, as shown in FIG. 1. Drive surfaces 13 are therefore provided, which extend between the bottom 12 and the wall 10 in the recess. These drive surfaces 13 also lay in a radial plane here. They form drive edges 14 on the inwardly aligned side, corresponding to the drive edges 4 of the tool in FIG. 1. The transition surfaces 15 extend from the drive edges 14 of the drive surfaces 13. These form a connection with the wall 10 of the recess. In addition, here, the transition surfaces 15 extend in a wedge-shaped form, from the outside edge 16 away from the drive edge 14 of every drive surface 13, from the drive surface 13 to the drive edge 14 of the next drive surface 13.

In FIG. 1, it was already mentioned that the transition surfaces 5 form an edge 6 with the outside of shaft 1. Such an edge 6 is also formed by the transition surfaces 15 in the recess. FIGS. 3 to 6 now show how these transition edges 6, which also define the form of the transition surfaces 5, can be designed.

FIG. 3 represents a possibility whereby the edge 6 forming the transition surfaces 5 is convex-shaped outwardly. With this, also the transition surfaces 5 are wedge-shaped and convex.

In the embodiment according to FIG. 4, the transition edge 6 extends concave-shaped, which means that the transition surface 5 is also formed concave.

FIGS. 5 and 6 show a plan view of drive designs whereby it can relate both to the drive design of a tool as well as to the drive design of a driven screw. The drive surfaces 2 and/or 13 are designated here by their/its drive edges 4 on the screwdriver and/or 14 in the recess. A drive should occur towards the arrow 17. Respectively two drive edges 4 extend parallel to one another and parallel to a diameter, whereby in the arrangement of FIG. 5 the drive edges 4 in drive direction lie in front of the diameter, while in the drive design of FIG. 6 the drive edges 4 lie respectively behind the diameter, to which they jointly extend in parallel.

With reference to FIG. 1, it was mentioned that the drive surfaces 2 lie in a radial plane. This is to ensure that the torque is transmitted in rotational direction. However, deviations are also possible from this radial plane, as far as it is made possible that forces in another direction are negligibly small or do not disturb as it does in the rotational direction. FIG. 7 now shows an arrangement in which the drive surface 2 turns back behind a radial plane, so that a force component is produced into the recess 9 of the screw. This force component however is negligibly small.

FIG. 8 shows an embodiment, in which the drive surface 2 lies in front of the radial plane, whereby also here a certain force component is produced in axial direction, which is likewise negligibly small. Such a solution as shown in FIG. 8 could be easier to produce than an exact radial plane.

Figure 9:
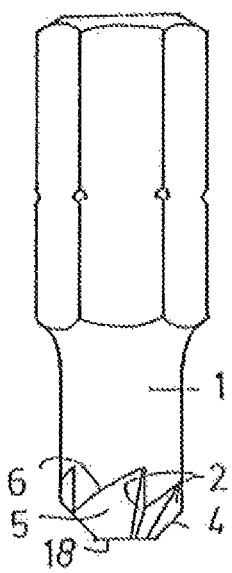
FIG. 9 the side view of a screwdriver bit.

FIG. 9 now shows the side view of a screwdriver bit that can be used in a conventional screwdriver. At the free end opposite the hexagon end, the screw bits feature an embodiment as it was indicated in FIG. 3, figure and FIG. 8. Here the drive surfaces 2 lie in a plane in front of a radial plane, corresponding to FIG. 8.

Figure 10:
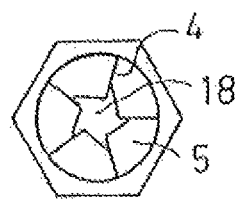
FIG. 10 the end face view of the screwdriver bit of FIG. 9.

FIG. 10 shows the view of the screwdriver bit of FIG. 9 from the bottom in FIG. 9, similar to FIGS. 5 and 6. You can also see from this that five drive edges 4 are provided, which are uniformly distributed over the circumference.

Figure 11:
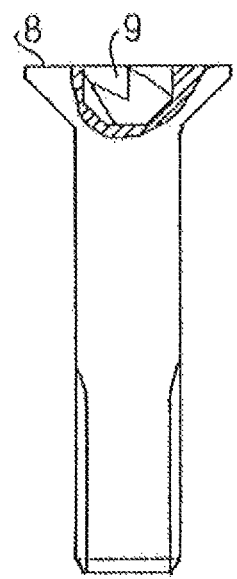
FIG. 11 a side view of a screw.

FIG. 11 now shows a screw with a recess head, in the drive recess 9 of which the surfaces are formed as they are complementary to the embodiment of the screwdriver bit in FIG. 9.

Figure 12:
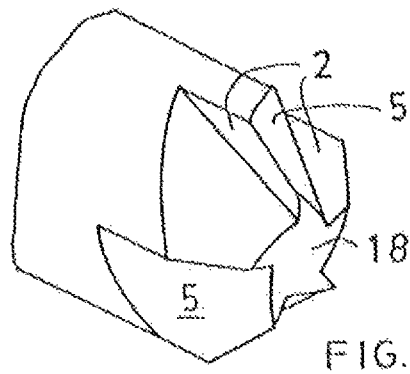
FIG. 12 a perspective representation of the front end of the screwdriver bit.

FIG. 12 shows the front end of the screwdriver bit of FIG. 9 in an isometric representation, with the drive surfaces 2, the transition surfaces 5, the drive edges 4 and the front star-shaped flat face end 18 which corresponds to the bottom 12 of the screwdriver recess 9 of FIG. 2.

While the previous figures deal with the representation of screws and accompanying tools, the following figures show nuts that are made according to the same principle.

Figure 13:
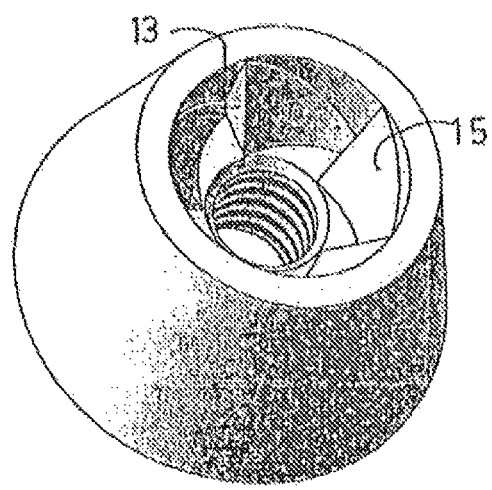
FIG. 13 a further perspective representation of a nut.
Figure 14:
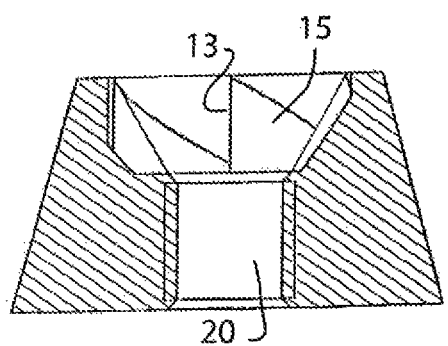
FIG. 14 an axial section through the nut of FIG. 13.
Figure 15:
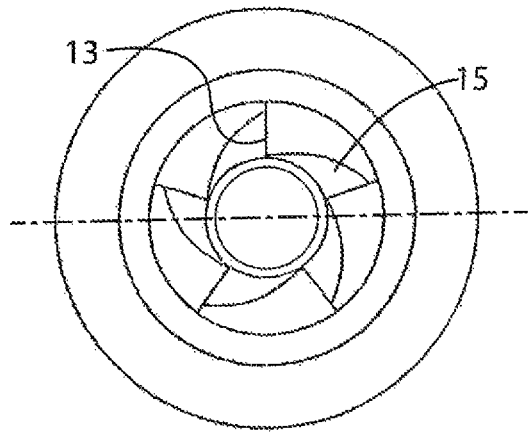
FIG. 15 a plan view of the nut of FIGS. 13 and 14.

FIGS. 13 to 15 show a nut in which the form of the transition surfaces 15 and drive surfaces 13 are formed in the same manner as in the screw according to FIG. 2, with the only difference that instead of a plane bottom 12, here the thread boring 20 is provided.

Figure 16:
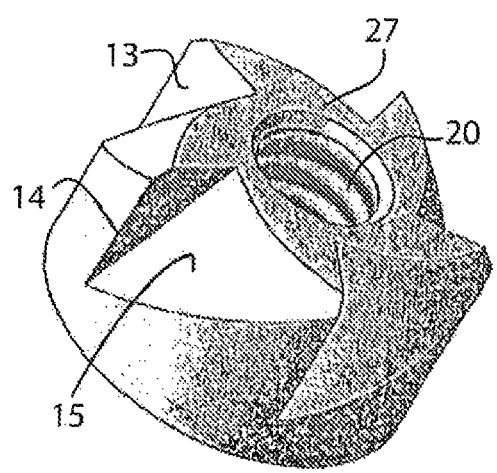
FIG. 16 a representation of a further embodiment.
Figure 17:
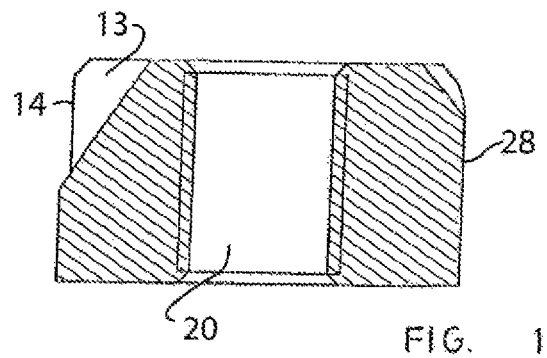
FIG. 17 an axial section through the nut of FIG. 16.
Figure 18:
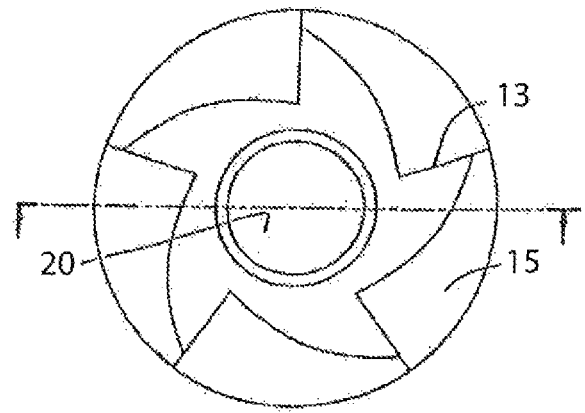
FIG. 18 a plan view of the nut of FIGS. 16 and 17.

FIG. 16 shows again another embodiment of a nut. From an end-face 27, a thread boring 20 goes through the nut. From the circumference of the thread boring 20, a series of drive surfaces 13 extends radial outwards, and between the drive surfaces 13, the transition surfaces 15 serving as guide surfaces extend. Outside the transition surfaces 15, the outside 28 of the nut features a cylindrical jacket, see also FIG. 17.

The represented exemplary embodiments relate to screws and nuts, as well as to the respectively complementary tools formed for these purposes. Naturally, there are also corresponding tools for the nuts with the surfaces disposed on the outside, however, which are not represented individually.

Obviously, also a screw head can feature an embodiment like the nuts in FIGS. 13 to 18 show.

The invention claimed is:

1. A screwdriver drive design for a screwdriver the engagement end of which features a form that is complementary to a fastening element drive design for a fastening element to be screwed, the fastening element drive design comprising
    a drive design surface formed to be complementary to at least two drive surfaces formed on the fastening element for transmission of a torque suitable for rotation with a tool in a first rotation direction and
    transition surfaces disposed between these drive surfaces, which form a guide surface for the tool when rotating the tool in the first rotation direction and upon engagement of the tool in the other rotation direction causes an axial outward displacement of the tool,
    wherein the transition surfaces are formed as outside surfaces, and
    wherein the transition surfaces of the fastening element drive design surface are formed as outside surfaces.

2. The screwdriver drive design according to claim 1, wherein the transition surfaces are formed as inwardly aligned surfaces.

3. The screwdriver drive design according to claim 1, wherein the drive surfaces of the fastening element drive design are disposed in radial planes.

4. The screwdriver drive design according to claim 1, wherein the drive surfaces of the fastening element drive design lie in a cross-section through the fastening element drive design respectively on a radius or parallel to a radius.

5. The screwdriver drive design according to claim 1, wherein in an even number of drive surfaces respectively two drive surfaces of the fastening element drive design extend in the cross-section of a diameter or parallel to a diameter.

6. The screwdriver drive design according to claim 1, wherein the drive surfaces of the fastening element drive design extend in a longitudinal section through the drive design parallel to the axis of rotation or in the axis of rotation.

7. The screwdriver drive design according to claim 1, wherein the drive surfaces of the fastening element drive design form a drive edge, whereby the drive edges of all drive surfaces diverge in the direction of the end face of the fastening element for a drive design formed in a recess and converge for a drive design formed on the outside.

8. The screwdriver drive design according to claim 1, wherein the transition surfaces of the fastening element drive design are formed as wedge-shaped surfaces.

9. The screwdriver drive design according to claim 8, wherein the transition surfaces of the fastening element drive design extend between the drive edge of a drive surface, the connection of the drive surface with the bottom of a recess and the wall of the recess.

10. The screwdriver drive design according to claim 1, with an odd number of drive surfaces and transition surfaces in the fastening element drive design.

11. The screwdriver drive design according to claim 1, wherein a recess of the fastening element drive design at least partially features a decreasing cross-section in the direction away from the end face the screw head.

12. The screwdriver drive design according to claim 1, wherein a recess of the fastening element drive design is partially at least formed cylindrical in shape.

13. The screwdriver drive design according to claim 1, wherein a recess of the fastening element drive design converges into a pointed tip.

14. The screwdriver drive design according to claim 1, wherein a recess of the fastening element drive design features a particularly plane bottom.

\* \* \* \* \*